April 28, 1931.  C. L. LAMPE  1,803,195
BLEED VALVE CONTROLLING MEANS
Filed Feb. 13, 1929  2 Sheets-Sheet 2
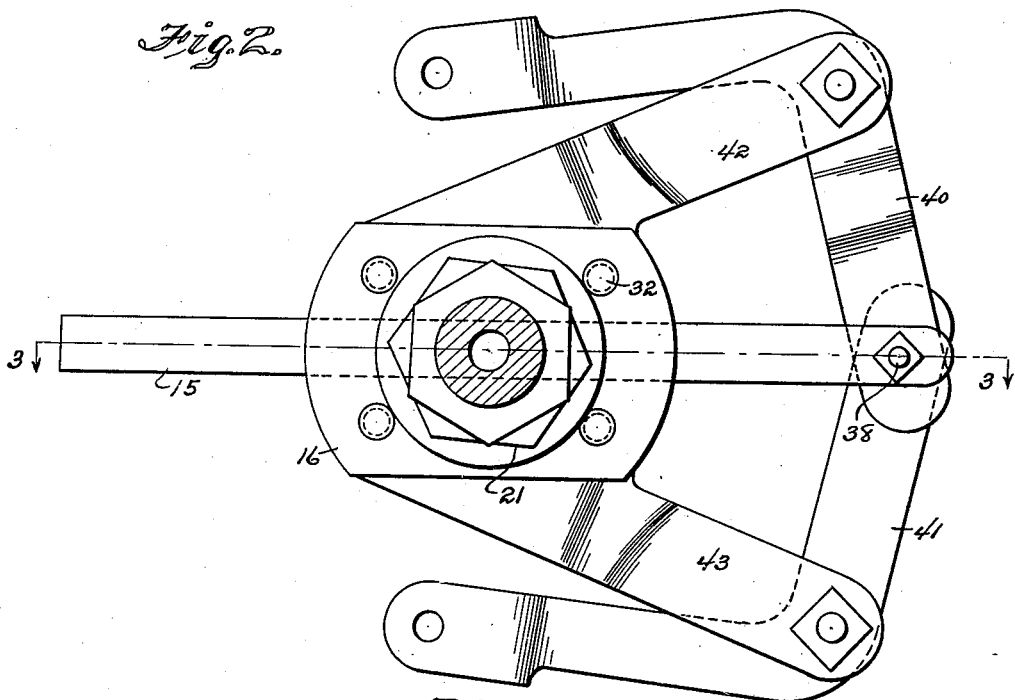
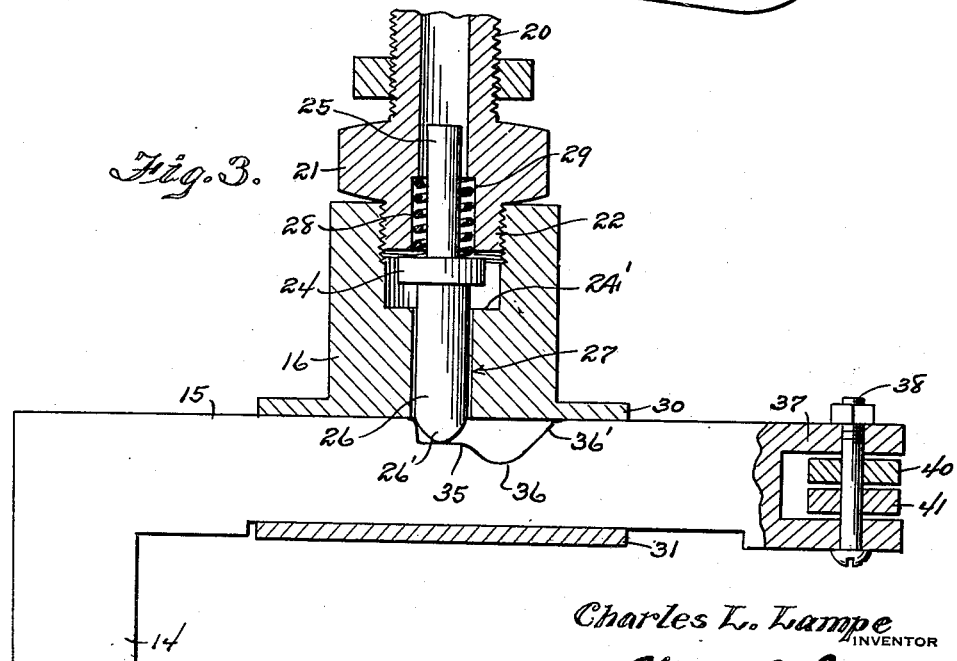
Charles L. Lampe, INVENTOR
BY Victor J. Evans ATTORNEY Patented Apr. 28, 1931

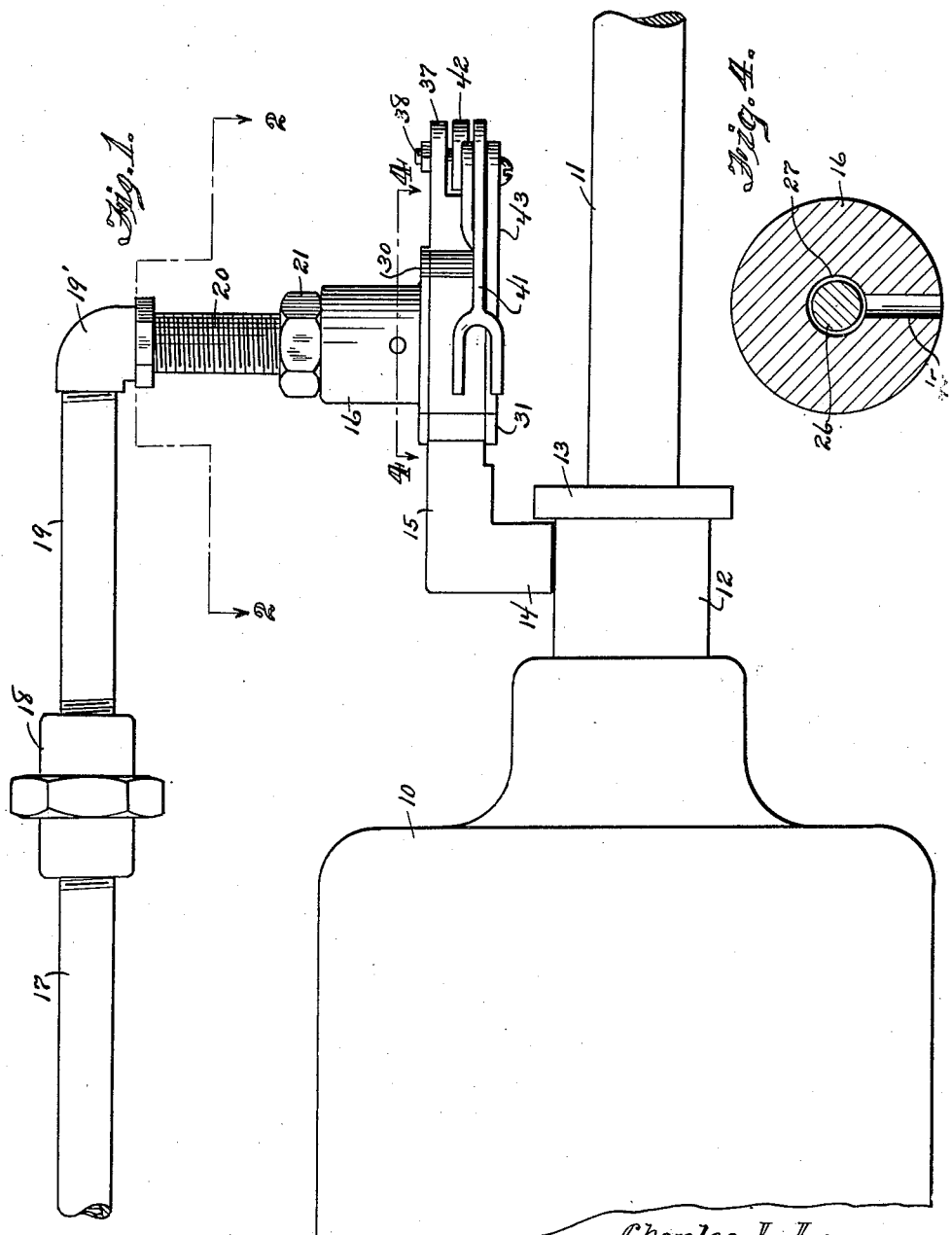

1,803,195

UNITED STATES PATENT OFFICE

CHARLES L. LAMPE, OF NAMPA, IDAHO

BLEED-VALVE-CONTROLLING MEANS

Application filed February 13, 1929. Serial No. 339,637.

The object of this invention is to provide improved controlling means for valves whereby it is possible to hold open for a sufficient interval the bleed valve of an auxiliary reservoir of an air brake system, so that the employee assigned to this work will lose no time during the bleeding operation, or after the initial opening movement,—and may therefore release the valves of many more cars in a specified time than would otherwise be possible.

A further object is to effect this result by a valve rod, or bar adapted for operation when the angle levers of approximately usual type are operated from either side of the car, the bar having a cam portion holding the valve open until the piston rod of the brake cylinder, and means carried by the piston rod, engage the bar, on the return of the piston, and move the bar to inactive position, so that the valve will close automatically.

With the foregoing and other objects in view, the invention consists in the novel construction and arrangement of elements disclosed, it being understood that modifications may be made within the scope of the claims without departing from the spirit of the invention.

In the drawings:—

Figure 1 is a view in elevation, it being understood that the device may apply in the most convenient position with reference to the piston rod of the brake cylinder.

Figure 2 is a section on line 2—2 of Figure 1, the angle arms, and the valve casing with the valve operating bar extending therethru, being in plan.

Figure 3 is a section on line 3—3 of Figure 2.

Figure 4 is a section on line 4—4 of Figure 1.

The brake cylinder is designated 10, the piston rod therefor is shown at 11, and a sleeve or the like 12 carried by the piston rod has thereon or formed therewith collar, flange, or band 13.

The element 13 just referred to moving with the piston rod 11, is to be engaged by the offset 14 of a valve operating bar 15, this bar being slidable thru the valve housing 16.

A pipe 17 from the reservoir, is connected by union or coupling 18 with pipe 19 and the latter is connected by an elbow 19' with the tubular element or nipple 20, the latter being threaded externally as shown in Figures 1 and 3 and including an angular portion 21.

The lower end 22 of the tubular element 20 is threaded into the valve chamber in casing or housing 16.

The valve 24 is carried by stem 25 and the lower end portion is enlarged, or may be enlarged, as shown at 26, and passes loosely thru bore 27 in housing 16. Valve 24 seats at 24', and is engaged by a coil spring 28 surrounding the valve stem, the upper end of the spring engaging the annular shoulder in the portion 21 of element 20.

The valve casing extends laterally as shown at 30 and 31 and provides a passage thru which bar 15 is slidable, screws or bolts shown at 32 serving an obvious purpose in connecting the elements of the housing and especially that portion thru which the bar 15 is movable.

The valve operating element or bar 15, just referred to includes the cut away portion, or cam portion 35, and a depression 36, and one end of the bar 15 is cut away to provide a fork 37 thru which the bolt 38 passes, this bolt connecting the approaching ends of angle levers 40 and 41 of approximately usual type, and adapted to be operated from either side of a car carrying the mechanism here disclosed.

The angle levers 40 and 41 are pivoted respectively to brackets or arms 42 and 43, the latter being connected with the housing before referred to. This housing is provided with a vent or exhaust port 45, and the flow of air thru this port is controlled by the position of valve 24, and the position of the latter is normally that defined by the pressure of spring 28 acting to close the valve. The employee desiring to bleed the valve, will operate either angle arm 40 or 41, and move bar 15 to the position of Figure 3, where it will remain, holding valve 24 open, as long as necessary. The valve will close automatically, at the proper time, or when the piston rod 11 moves to the left in Figure 1, and the element 13 engages offset portion 14 of bar 15, thereby bringing the lower rounded end 26' of the valve stem to position opposite the depression 36, at which time valve 24 closes under the action of spring 28.

When the manual means are operated to ascertain if air is entering the reservoir, stem 26 will be above curved, sloping, or inclined wall 36' of cut away portion or depression 36, and therefore the closing movement will be automatic.

What I claim is:—

1. In a device of the class described, a valve casing, a valve therein, a valve stem, means normally holding the valve closed, mechanical means for opening the valve, and including a slidable bar engaging the stem, said bar and stem being movable in paths perpendicular to each other and the bar having a depressed portion thereon and a lower depression having a sloping wall, and means on the bar adapted for engagement by a reciprocable member of an air brake mechanism, for moving the bar in a direction to cause the stem to pass into the lower depression and permit the valve closing means to operate automatically.

2. In a device of the class described, a valve casing, a valve therein, a valve stem, means normally holding the valve closed, mechanical means for opening the valve, and including a slidable bar engaging the stem, the bar having a cam portion thereon below the surface of the bar, and a cut away portion having a sloping wall adjacent to the cam portion, and means on the bar adapted for engagement by a reciprocable member of an air brake mechanism, for moving the bar in a direction to cause the stem to pass to the lowest point in the cut away portion and permit the valve closing means to operate automatically.

In testimony whereof I affix my signature.

CHARLES L. LAMPE.